US006941253B1

(12) United States Patent
Morishita (10) Patent No.: US 6,941,253 B1
(45) Date of Patent: Sep. 6, 2005

(54) CONTROL CODE READ-OUT SYSTEM

(75) Inventor: Takuya Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 790 days.

(21) Appl. No.: 09/650,998

(22) Filed: Aug. 30, 2000

(30) Foreign Application Priority Data

Sep. 17, 1999 (JP) .......................................... 11/262987

(51) Int. Cl.$^7$ .............................................. G06F 17/30
(52) U.S. Cl. ............................ 703/3; 707/10; 382/233
(58) Field of Search .......................... 358/1.18; 725/24, 725/36; 381/23; 380/37, 201; 382/233, 236; 709/238; 707/3, 1, 10; 713/168; 348/700

(56) References Cited

U.S. PATENT DOCUMENTS

| 5,812,980 | A | | 9/1998 | Asai ............................... 705/1 |
| 5,815,217 | A | * | 9/1998 | Kumazawa et al. ........ 348/700 |
| 5,825,731 | A | | 10/1998 | Yokota |
| 5,903,705 | A | * | 5/1999 | Yonemitsu et al. ........... 386/95 |
| RE37,808 | E | | 7/2002 | Yokota |
| 2001/0033695 | A1 | * | 10/2001 | Okuno et al. ............... 382/233 |
| 2002/0140585 | A1 | * | 10/2002 | Haggar et al. ................. 341/60 |
| 2002/0141582 | A1 | * | 10/2002 | Kocher et al. .............. 380/201 |

FOREIGN PATENT DOCUMENTS

| JP | 7-234784 A | 9/1995 |
| JP | 2546504 | 8/1996 |
| JP | 9-161375 | 6/1997 |
| JP | 9-258961 | 10/1997 |
| JP | 10-164051 | 6/1998 |
| JP | 10-208385 | 8/1998 |
| JP | 10-283262 | 10/1998 |
| JP | 11-120695 A | 4/1999 |
| JP | 11-143642 | 5/1999 |

* cited by examiner

Primary Examiner—Charles Rones
Assistant Examiner—Tony Mahmoudi
(74) Attorney, Agent, or Firm—Foley & Lardner LLP (57) ABSTRACT

Embodiments of the present invention include a control code read-out system in which a control code for access restriction corresponding to a playback control code of a recording medium is held in a playback apparatus, and the control code held in the playback apparatus is read-out when the recording medium is played back, and a comparison between the playback control code of the recording medium to be played back and the control code stored in the playback apparatus being made, and playback of the recording medium being performed only when there is coincidence between the two control codes. One embodiment of the system comprises a first portion for encrypting the control code of the playback apparatus and storing an encrypted control code in a control code storage portion, a second portion for read-out the encrypted control code from the control code storage portion, and decrypting, when playing back the recording medium.

10 Claims, 5 Drawing Sheets

PRIOR ART

CONTROL CODE READ-OUT SYSTEM

BACKGROUND OF THE INVENTION

1. Field of the Invention

The present invention relates to a control code read-out system, and more particularly to a control code read-out system which reads out a region code, which is one of control codes in a DVD playback apparatus.

2. Related Art

In the DVD-Video (Digital Versatile Disc) specification which is a video specification of DVD, a region code is used. In the prior art, as disclosed in Japanese Unexamined Patent Publication (KOKAI) No.11-143642, a control code read-out system has been used to change this region code.

Figure 5:
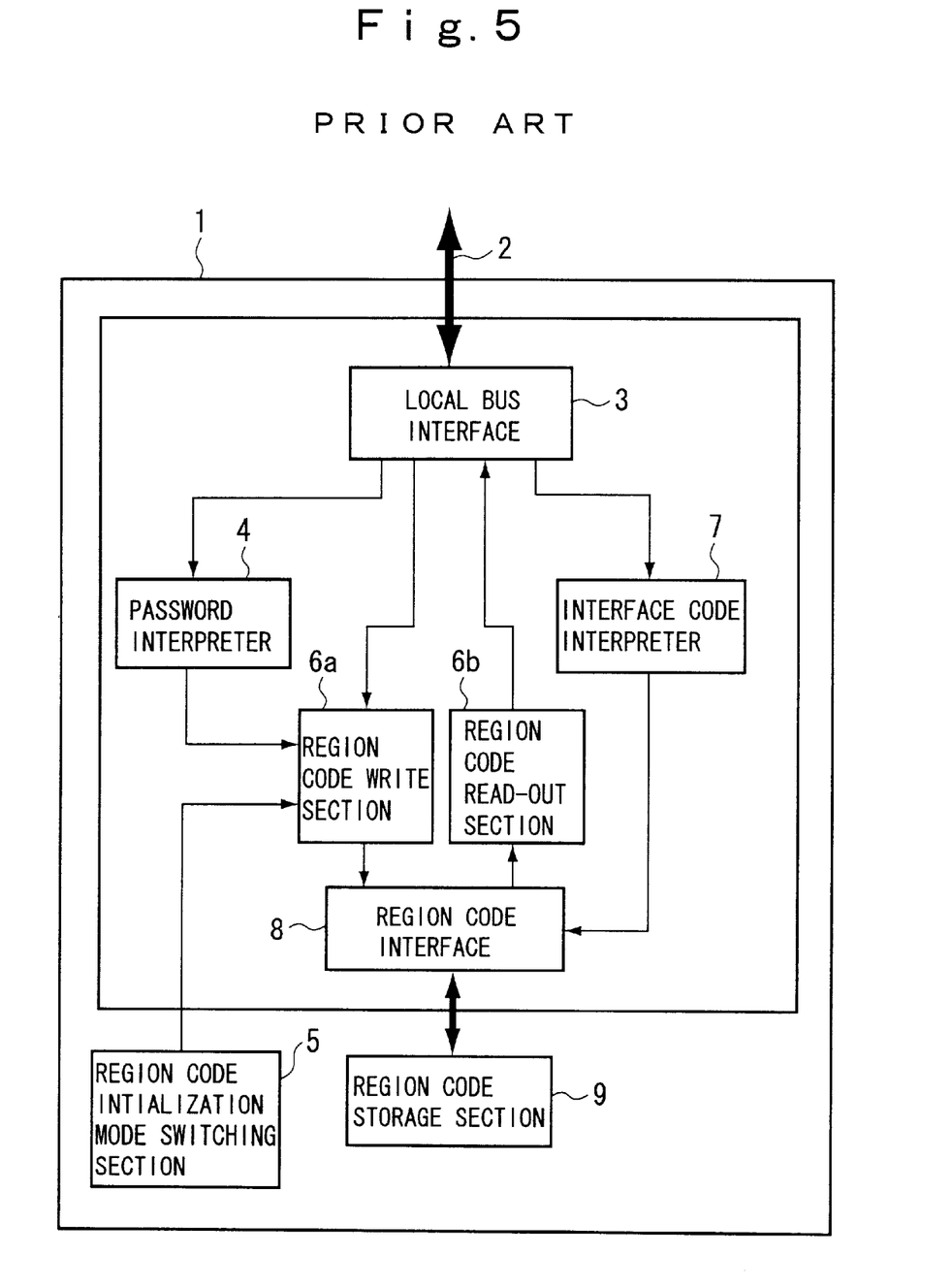
FIG. 5 is a block diagram of prior art.

FIG. 5 shows an example of the configuration of a control code read-out system of the above-mentioned prior art. This control code read-out system of the past has a region code storing section 9, a region code initialization mode switching section 5, for allowing initialization of the region code, a password interpretation section 4 that interprets a password of a prescribed bit length that is input from a local bus 2 and a local bus interface 3, a region code write section 6a, a region code read-out section 6b, and interface code interpretation section 7, which interprets an interface code that is input from the local bus 2 and the local bus interface 3, and a region code interface 8.

In this control code read-out system of the past, in the initialization mode, if the input password and interface code coincides with a password and interface code that are stored in the region code initialization apparatus 1, the region code is updated (initialized).

In the control code read-out system of the past, however, because protective measures of the region code such as encrypting are not provided, if the region code is stored in a file device, it is easy to decrypt the region code stored in the apparatus.

Additionally, because the control code read-out system of the past had no means for storing the number of changes of the region code, it was completely impossible for the user to change the region code.

Accordingly, it is an object of the present invention, in consideration of the above-noted drawbacks in the prior art, to provide a control code read-out system that can achieve access restriction by a region code, using only software.

It is another object of the present invention to provide a control code read-out system that can allow a user to change the region code.

SUMMARY OF THE INVENTION

In order to achieve the above-noted objects, the present invention has the following technical constitution.

Specially, the first aspect of the present invention is a control code read-out system which a control code for access restriction corresponding to a playback control code of a recording medium is held in a playback apparatus, and the control code held in the playback apparatus is read-out when the recording medium is played back, and a comparison between the playback control code of the recording medium to be played back and the control code stored in the playback apparatus being made, and playback of the recording medium being performed only when there is coincidence between these two, the system comprising: a first means for encrypting the control code of the playback apparatus and storing an encrypted control code in a control code storage means, a second means for read-out the encrypted control code from the control code storage means, and decrypting, when playing back the recording medium.

In the present invention, because the encrypted control code for restricting access is stored in the control code storage means, even should a third part read-out the encrypted control code in the control code storage means, it is not possible to decrypt the control code, thereby providing protection for the control code.

In the second aspect of the present invention, the control code read-out system further comprising a third means for initializing the control code storage means, when the encrypted control code is read out from the control code storage means and the encrypted control code does not exist in the control code storage means.

In the third aspect of the present invention, the third means encrypts a pre-established value so as to obtain an encrypted initialization value and storing the encrypted initialization value in the control code storage means.

In the fourth aspect of the present invention, the control code read-out system further comprising: a fourth means for storing a number of changes of the control code in an encrypted condition in a number of changes storage means, a fifth means which, based on an instruction of change of the control code held in the playback apparatus, reads out an encrypted number of changes from the number of changes storage means and decrypts the encrypted number of changes, a sixth means which, only when a number of changes decrypted by the fifth means has not reached a pre-established upper limit, encrypts a control code that is input with the instruction of change of the control code, and stores an encrypted control code in the control code storage means, and a seventh means which, only when the number of changes decrypted by the fifth means has not reached a pre-established upper limit, increments the decrypted number of changes by 1, encrypts an incremented number of changes, and stores the incremented number of changes in the number of changes storage means.

In the present invention, the number of changes of the control code is encrypted and stored in a number of changes storage means, and based on the instruction of a change in the control code, the fifth means decrypts the encrypted number of changes read out from the number of changes storage means and compares it with the pre-established upper limit so as to determine if the upper limit has been reached. Only if the upper limit has not been reached, the control code is encrypted and stored in the control code storage means.

In the fifth aspect of the present invention, the fifth means initializes the number of changes storage means, when the encrypted number of changes is readout from the number of changes storage means and the encrypted number of changes does not exist in the number of changes storage means.

In the sixth aspect of the present invention, the fifth means encrypts a pre-established value so as to obtain an encrypted initialization value and storing the encrypted initialization value in the number of changes storage means.

The seventh aspect of the present invention is a control code read-out system comprising; an eighth means which calculates a checksum of the encrypted control code and a checksum of the encrypted number of changes and stores the checksums in a checksum storage means, a ninth means for read-out the checksums from the checksum storage means; and a tenth means for performing a check of coincidence between the encrypted control code read out by the second means and checksum read out by the ninth means, and coincidence between the encrypted number of changes read out by the fifth means and checksum read out by the ninth means, so as to examine whether the encrypted control code or the encrypted number of changes have been tampered with, wherein the second means, upon receipt of test results indicated by the tenth means that tampering had not occurred, decrypts the encrypted control code read out from the control code storage means, and the fifth means, when receiving test results indicated by the tenth means that tampering had not occurred, decrypts the encrypted number of changes read out from the number of changes storage means.

In the present invention, only when the results of the test for tampering by the tenth means indicate that tampering has not occurred, decrypting of the encrypted control code and encrypted number of changes is permitted thereby enabling further protection of the control code and number of changes.

The eighth aspect of the present invention is a control code read-out system comprising an eleventh means for generating a random number, wherein the sixth means encrypts the control code by using a random number generated from the eleventh means, and the seventh means encrypts the number of changes by using a random number generated from the eleventh means.

In the ninth aspect of the present invention, the control code is a region code that stores in a DVD-Video disc player.

DETAILED DESCRIPTION OF THE PREFERRED EMBODIMENTS

Preferred embodiments of the present invention are described in detail below, with references made it to relevant accompanying drawings.

Figure 1:
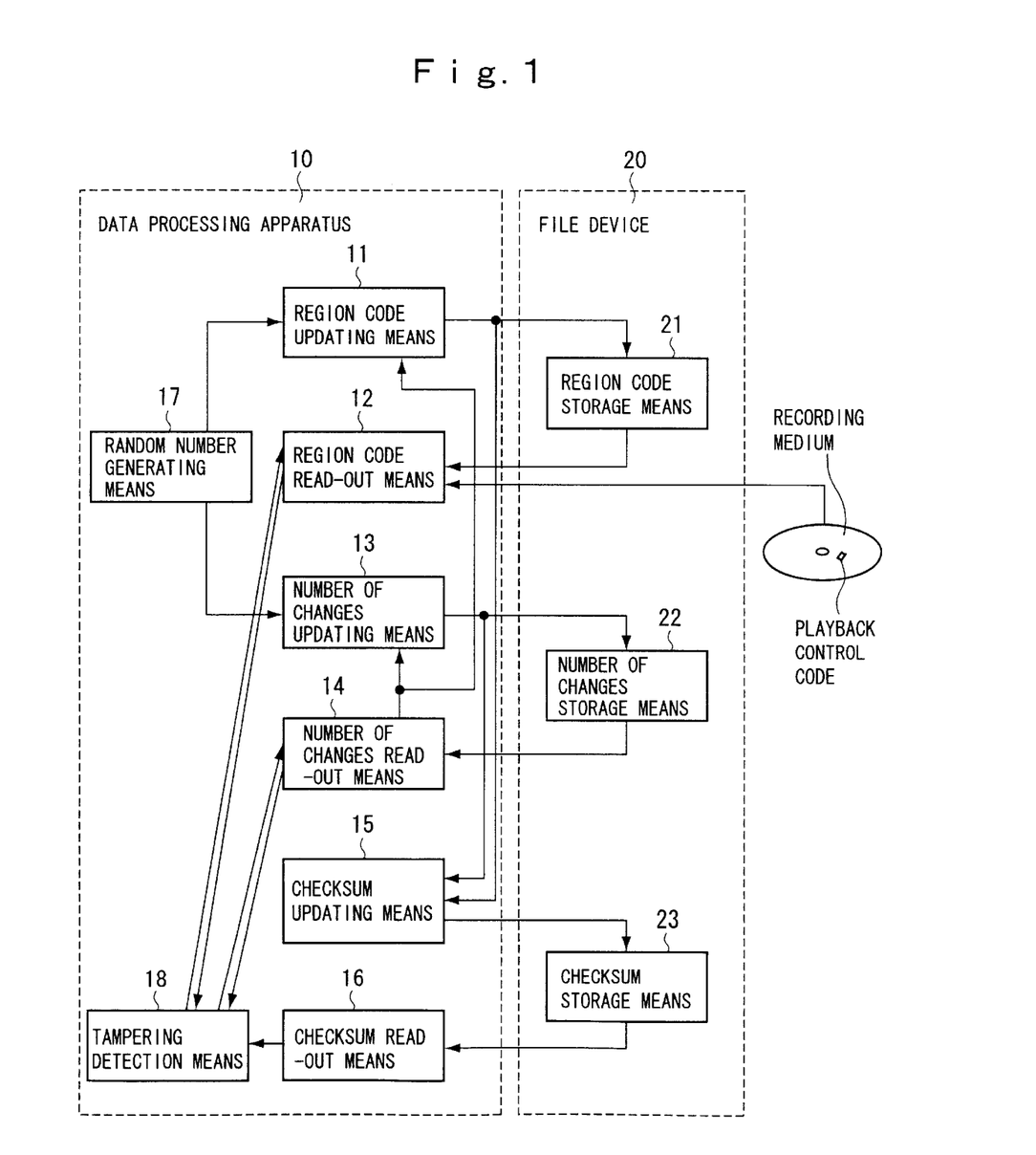
FIG. 1 is a block diagram of an embodiment of the present invention.

FIG. 1 is a block diagram showing an embodiment of a control code read-out system according to the present invention. This embodiment of a control code read-out system is comprises a data processing apparatus 10 and a file device 20.

The data processing apparatus 10 includes a region code updating means (the first means) 11, a region code read-out means (the second means) 12, a number of changes updating means (the sixth means) 13, a number of changes read-out means (the fourth means) 14, a checksum updating means (the seventh means) 15, a checksum read-out means (the eighth means) 16, a random number generating means (the tenth means) 17, and a tampering detection means (the ninth means) 18. The file device 20 includes a region code storage means 21 that stores an encrypted region code, a number of changes storage means 22, that stores an encrypted number of changes, and a checksum storage means 23 that stores a checksum of the encrypted region code and a checksum of the encrypted number of changes. The above-mentioned means 11–18 of the data processing apparatus 10 are implemented by software stored in a central processing unit (CPU).

The region code updating means 11 in the data processing apparatus 10 encrypts the region code and stores the encrypted region code in the region code storage means 21. The region code read-out means 12 reads out an encrypted region code stored in the region code storage means 21, and decrypts the encrypting thereof so as to obtain a decrypted region code. The number of changes updating means 13 encrypts the number of changes and stores it in the number of changes storage means 22. The number of changes read-out means 14 reads out the encrypted number of changes stored in the number of changes storage means 22, decrypts the encrypted number of changes, and obtains thereby the number of changes.

The checksum updating means 15 calculates the checksum of the encrypted region code and the checksum of the encrypted number of changes, and stores these checksum in the checksum storage means 23. The checksum read-out means 16 reads out the checksum stored in the checksum storage means 23. The random number generating means 17 generates a random number for encrypting. The tampering detection means 18 performs a check for agreement between the encrypted region code and the checksum of the encrypted region code, and agreement between the encrypted number of changes and the checksum of the encrypted number of changes, thereby performing a test as to whether or not the encrypted region code or encrypted number of changes have been tampered with.

Next, the operation of the embodiment shown in FIG. 1 is described in detailed below, with references made to the flowcharts of FIG. 2 to FIG. 4.

In this embodiment, a DVD playback apparatus holds the region codes therein, and at the time of playback of a DVD-Video disc, and only when the region code of the playback apparatus itself coincides with the region code recorded on the DVD-Video disc that is to be played back, playback of the DVD-Video disc will be permitted.

First, the operation in the case in which there is an inquiry as to the number of the region code of the playback apparatus itself from the playback apparatus is as follows. In this case, the region code read-out means 12 in the data processing apparatus 10 examines if the encrypted region code is stored in the region code storage means 21 in the file device 20 (step A1 in FIG. 2). If the region code is not stored therein, the initialization processing to be described below is performed (step A2 in FIG. 2).

Figure 2:
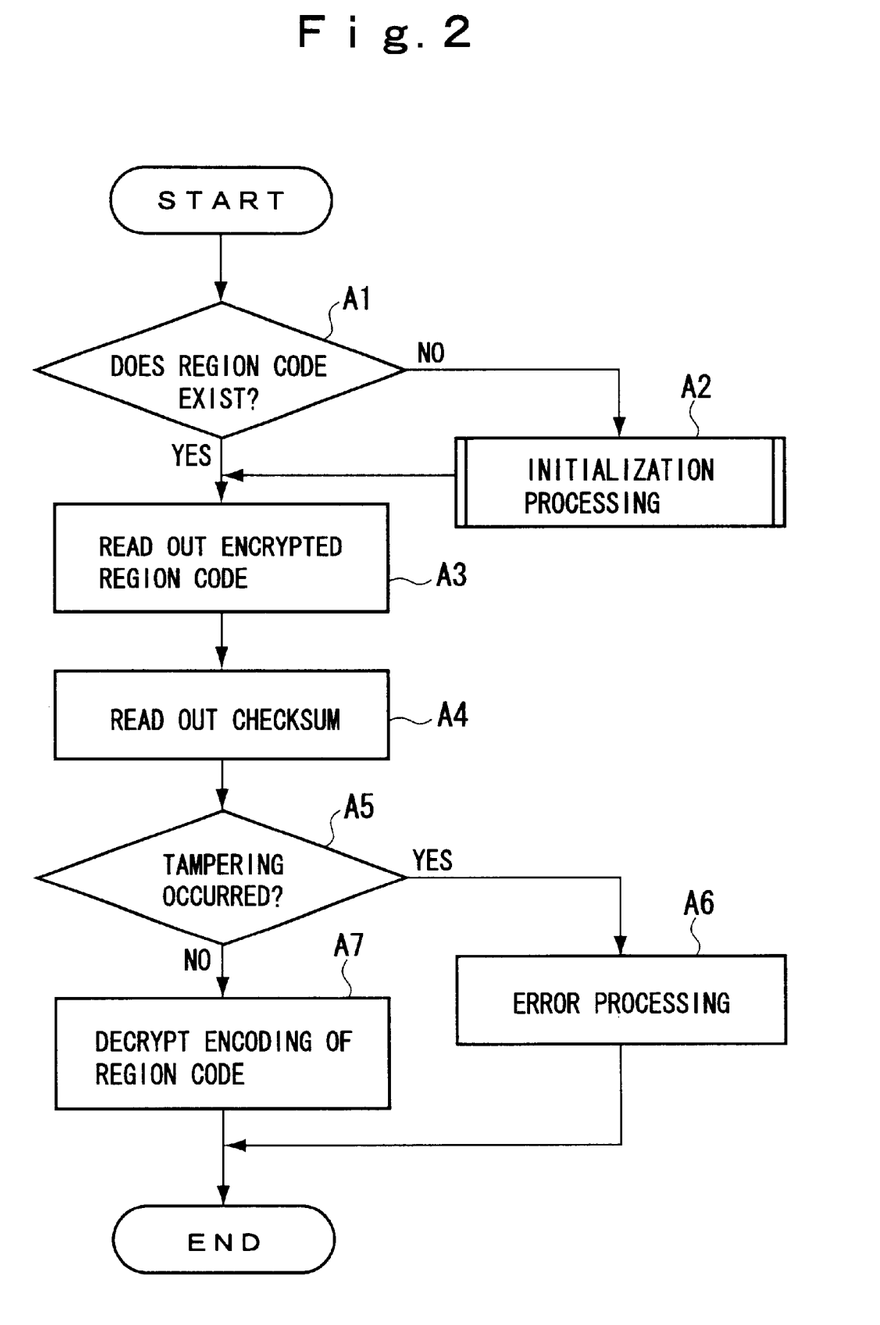
FIG. 2 is a flowchart illustrating operation of the embodiment of FIG. 1 in response to a region code inquiry.

If, however, the region code had been stored therein, the region code read-out means 12 reads out the encrypted region code from the region code storage means 21 (step A3 of FIG. 2). Then, the checksum read-out means 16 reads out the encrypted checksum stored in the checksum storage means 23 (step A4 of FIG. 2).

Next, the tampering detection means 18 performs a test for agreement between the encrypted region code and the checksum of the encrypted region code, so as to determine whether or not the encrypted region code has been tampered with (step A5 of FIG. 2). If, as a result of this tests, the tampering detection means 18 determines that tampering has occurred, error processing is performed (step A6 of FIG. 2), and an abnormal termination occurs. If, however, the result of this test is that the tampering detection means 18 determines that tampering had not occurred, this fact is notified to the region code read-out means 12, and the region code read-out means 12 decrypts the encrypting of the region code, notifying the playback apparatus of the thus-obtained region code (step A7 of FIG. 2).

Next, the operation in the case in which the playback apparatus according to the present invention outputs a command to change the region code held therein is as follows. Because the region codes are assigned to the pre-established regions in the world, respectively, the case in which a DVD-Video playback apparatus is shipped to various regions by a manufacturer, it is necessary to change the region code held in the apparatus to suit the target region. Additionally, there are cases in which a user wants to change the region code held in the playback apparatus to the same value of region code recorded on the DVD-Video. In such cases, a command to change the region code stored in the playback apparatus is output to the data processing apparatus 10.

Figure 3:
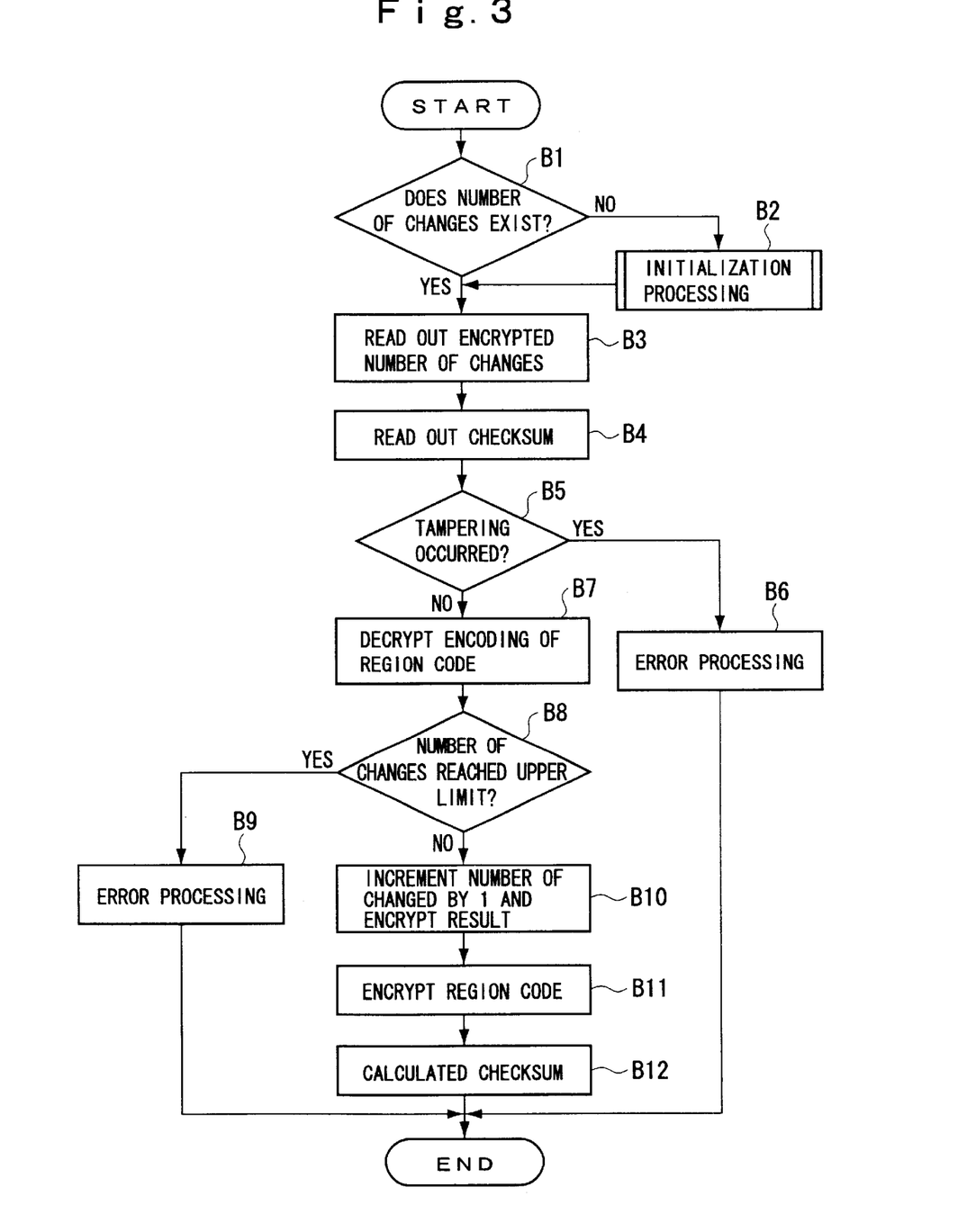
FIG. 3 is a flowchart illustrating operation of the embodiment of FIG. 1 in response to receipt of a command to change the region code.

In the above case, first the number of changes read-out means 14 in the data processing apparatus 10 examines if the encrypted number of changes is stored in the number of changes storage means 12 in the file device 20 (step B1 of FIG. 3). If the number of changes had not been stored therein, initialization processing to be described below is performed (step B2 of FIG. 3). If, however, the number of changes had been stored therein, the encrypted number of changes is read out from the number of changes storage means 22 by the number of changes read-out means 14 (step B3 of FIG. 3).

Next, the checksum read-out means 16 reads out the checksum of the encrypted number of changes from the checksum storage means 23 (step B4 of FIG. 3). Then, the tampering detection means 18, in order to perform a determination as to whether or not the encrypted number of changes has been tampered with, performs a tests of agreement between the encrypted number of changes read out by the number of changes read-out means 14 and the checksum of number of changes read out by the checksum read-out means 16 (step B5 of FIG. 3).

As a result of this test, if the tampering detection means 18 determines that tampering had occurred, error processing is performed (step B6 of FIG. 3), and an abnormal termination occurs. If, however, the test results indicate that tampering had not occurred, this fact is notified to the number of changes read-out means 14, and the encrypted number of changes is decrypted by the number of changes read-out means 14 (step B7 of FIG. 3). The number of changes updating means 13 receives the decrypted number of changes from the number of changes read-out means 14, and performs a tests as to whether the number of changes is within the pre-established upper limit (for example 5) of the number of changes (step B8 of FIG. 3).

If the result of this determination is that the number of changes has reached the upper limit, error processing is performed, and abnormal termination occurs (B9 of FIG. 3). If, however, the number of changes has not reached the pre-established upper limit, the number of changes updating means 13 increments the number of changes by 1, and after incrementing encrypts the incremented value and stores it in the number of changes storage means 22 (step B10 of FIG. 3).

The region code updating means 11 encrypts the region code included in the instruction to change the region code received from the playback apparatus and stores it in the region code storage means 21 (step B11 of FIG. 3).

In performing these operations, it is desirable that the encrypting method for the region code and the number of changes has redundancy in the encrypted information, and further that a random number is used so that the results are different every time. When encrypting the values 1 to 6, the simplest method is to perform replacement using a simple rule. For example, replacement of 1 by A, 2 by B, and 3 by C, and so forth, with replacement upon decrypting of A by 1, B by 2, and C by 3. In this case, if the storage location of the encrypted region code is known, there is a possibility that it can be easily decrypted. If a random number which causes the conversion to be made differently each time is used, there is a decrease in the danger of decrypting. However, because the amount of information to be hidden is small, it is not difficult to attempt to decrypt it.

However, if redundancy is imparted to the information, it becomes difficult to guess the information. One method of imparting redundancy to the information is, for example, the method described below.

In this method, if a one-digit integer x is to be converted to a 5-digit integer abcde (where a through e represent the digits from the ten thousand's place to the 1's place), the calculation is made using random numbers a, b, c, d, and e such that the relationship $$x=a+b-c+d-e \qquad (1)$$

is satisfied.

In the above, a rearrangement of the above expression results in $$x+c+e=a+b+d \qquad (2).$$

Based on the above relationship, the value of c and e are determined first by the random number generating means 17, x+c+e is calculated, and a, b, and d such that this calculated sum is equal to the values a+b+d are calculated. In the case of reversed conversion of a 5-digit integers abcde to a single-digit integer x, x is obtained by using the equation (1).

At step B12, the checksum updating means 15 calculates the checksum of the encrypted region code and the encrypted number of changes, this newly calculated checksum being stored in the checksum storage means 23 (step B12 of FIG. 3).

The method of performing of the above-noted checksum calculation can be one, for example, in which the sum of the encrypted region code and encrypted number of changes is simply calculated, however, it is desirable that an electronic signature is used to check for tampering.

The initialization processing performed at steps A2 and B2 is described below, with reference made to the flowchart of FIG. 4. First, the region code updating means 11 initializes the region code to a pre-established value (for example, in the case of DVD playback apparatus sold in Japan, the value of the region code is 2) (step C1 of FIG. 4). Next, the region code updating means 11 encrypts the initialized region code using a random number generated by the random number generating means 17, and stores the encrypted initialized region code in the region code storage means 21 (step C2 of FIG. 4).

Figure 4:
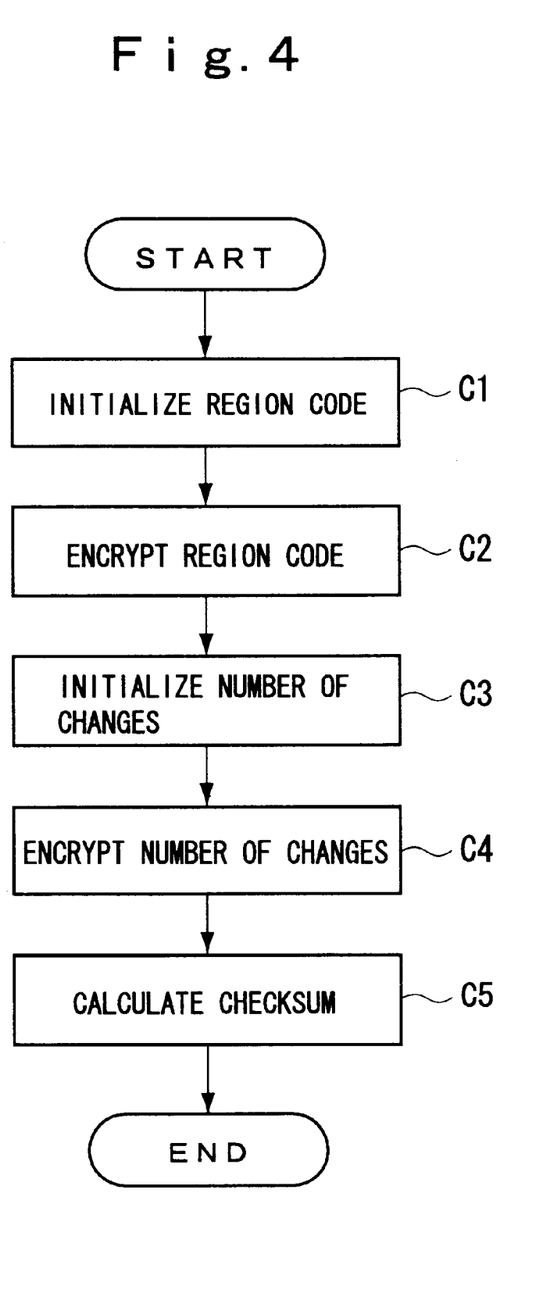
FIG. 4 is a flowchart illustrating initialization processing in FIG. 2 and FIG. 3.

Next, the number of changes updating means 13 initializes the number of changes to 0 (step C3 of FIG. 4). Then, the number of changes updating means 13 encrypts the initialized number of changes using a random number from the random number generating means 17, and stores the encrypted initialized number of changes in the number of changes storage means 22 (step C4 of FIG. 4). Finally, the checksum updating means 15 calculates the checksum of the encrypted initialized region code and the checksum of encrypted initialized number of changes, and stores these calculated checksums in the checksum storage mean 23 (step C5 of FIG. 4).

Thus, in this embodiment of the present invention, because the region code is encrypted and stored in the region code storage means 21, it is difficult to decrypt the region code, thereby enabling restriction of access by means of the region code according to the present invention. In this embodiment, the number of changes of the region code can be updated by the number of changes updating means 13, and the number of changes is encrypted so that it cannot be easily tampered with, and furthermore it is possible to permit a user to change the region code within the limited number of times.

It will be understood that the foregoing embodiment of the present invention is not intended to restrict the present invention, and that the present invention maybe applied in the same manner to an access-restricting control code other than the region code. In the foregoing embodiment, the DVD playback apparatus includes a number of changes updating means 13, a number of changes read-out means 14 and a number of changes storage means 22, however, it is not essential for the present invention to have above-mentioned means which permit changing of the region code.

As described in detailed above, according to the present invention, a control code used in restricting access is stored in an encrypted form in a control code storage means, so that even if a third party reads the control code obtained from the control code storage means, it cannot be decrypted, and can only be decrypted by software in an authorized apparatus, thereby enabling access restriction using a control code according to the present invention and software alone.

Additionally, according to the present invention, only in the case in which a test results indicates that the tampering detection means determines that tampering has not been done, it is possible to decrypt the encrypting of the control code and number of times, so that it is possible to provide further protection for the control code and number of times, thereby improving the reliability of access restriction by means of a control code using software only.

What is claimed is:

1. A control code read-out system in which a control code for access restriction corresponding to a playback control code of a recording medium is stored in a playback apparatus, and said control code stored in said playback apparatus is read-out when said recording medium is played back, and a comparison between said playback control code of said recording medium to be played back and said control code stored in said playback apparatus is performed, and playback of said recording medium is performed only when there is coincidence between said playback control code of said recording medium and said control code stored in said playback apparatus, said system comprising:

means for reading out and decoding an encoded number of changes, to provide a decoded number of changes, from a number of changes storage unit and for determining whether the encoded number of changes has reached a pre-established upper limit means for encrypting said control code of said playback apparatus and storing an encrypted control code in a control code storage unit only when the number of changes read by said reading and determining has not reached said pre-established upper limit, means for incrementing the decoded number of changes by one, encrypting the incremented number of changes storing the incremented number of changes in said control code storage unit only when the number of changes read by said reading and determining means has not reached said pre-established upper limit, means for read-out said encrypted control code from said control code storage unit, and decrypting, when playing back said recording medium.

2. A control code read-out system according to claim 1, wherein said system further comprising means for initializing said control code storage unit, when said encrypted control code is read out from said control code storage unit and said encrypted control code does not exist in said control code storage unit.

3. A control code read-out system according to claim 2, wherein said means for initializing encrypts a pre-established value so as to obtain an encrypted initialization value and said encrypting and storing means storing said encrypted initialization value in said control code storage unit.

4. A control code read-out system according to claim 1, wherein said control code is a region code that stores in a DVD-Video disc player.

5. A control code read-out system in which a control code for access restriction corresponding to a playback control code of a recording medium is stored in a playback apparatus, and said control code stored in said playback apparatus is read-out when said recording medium is played back, and a comparison between said playback control code of said recording medium to be played back and said control code stored in said playback apparatus is performed, and playback of said recording medium is performed only when there is coincidence between said playback control code of said recording medium and said control code stored in said playback apparatus, said system comprising:

a first means for encrypting said control code of said playback apparatus and storing an encrypted control code in a control code storage means;

a second means for read-out said encrypted control code from said control code storage means, and decrypting, when playing back said recording medium;

a third means for storing a number of changes of said control code in an encrypted condition in a number of changes storage unit, a fourth means which, based on an instruction of change of said control code held in said playback apparatus, reads out an encrypted number of changes from said number of changes storage unit and decrypts said encrypted number of changes, a fifth means which, only when a number of changes decrypted by said fourth means has not reached a pre-established upper limit, encrypts a control code that is input with said instruction of change of said control code, and stores an encrypted control code in said control code storage means, and a sixth means which, only when said number of changes decrypted by said fourth means has not reached a pre-established upper limit, increments said decrypted number of changes by 1, encrypts an incremented number of changes, and stores said incremented number of changes in said number of changes storage unit.

6. A control code read-out system according to claim 5, wherein said fourth means initializes said number of changes storage unit, when said encrypted number of changes is read out from said number of changes storage unit and said encrypted number of changes does not exist in said number of changes storage unit.

7. A control code read-out system according to claim 6, wherein said fourth means encrypts a pre-established value so as to obtain an encrypted initialization value and storing said encrypted initialization value in said number of changes storage unit.

8. A control code read-out system according to claim 5, said system further comprising:
- an seventh means which calculates a checksum of said encrypted control code and a checksum of said encrypted number of changes and stores said checksums in a checksum storage means,
- a eighth means for read-out said checksums from said checksum storage means; and
- a ninth means for performing a check of coincidence between said encrypted control code read out by said second means and checksum read out by said eighth means, and coincidence between said encrypted number of changes read out by said fourth means and checksum read out by said eighth means, so as to examine whether said encrypted control code or said encrypted number of changes have been tampered with,
- wherein said second means, upon receipt of test results indicated by said ninth means that tampering had not occurred, decrypts said encrypted control code read out from said control code storage means, and said fourth means, when receiving test results indicated by said ninth means that tampering had not occurred, decrypts said encrypted number of changes read out from said number of changes storage unit.

9. A control code read-out system according to claim 5, said system further comprising an tenth means for generating a random number, wherein said fifth means encrypts said control code by using a random number generated from said tenth means, and said sixth means encrypts said number of changes by using a random number generated from said tenth means.

10. A control code read-out method in which a control code for access restriction corresponding to a playback control code of a recording medium is stored in a playback apparatus, and said control code stored in said playback apparatus is read-out when said recording medium is played back, and a comparison between said playback control code of said recording medium to be played back and said control code stored in said playback apparatus is performed, and playback of said recording medium is performed only when there is coincidence between said playback control code of said recording medium and said control code stored in said playback apparatus, said method comprising the steps of:
- reading out and decoding an encoded number of changes, to provide a decoded number of changes, from a number of changes storage unit and for determining whether the encoded number of changes has reached a pre-established upper limit
- encrypting said control code of said playback apparatus and storing an encrypted control code in a control code storage unit only when the number of changes has not reached said pre-established upper limit,
- incrementing the decoded number of changes by one, encrypting the incremented number of changes storing the incremented number of changes in said control code storage unit only when the number of changes has not reached said pre-established upper limit,
- read-out said encrypted control code from said control code storage unit, and decrypting, when playing back said recording medium.

* * * * *